US008641005B2

(12) United States Patent
Cimaglio

(10) Patent No.: US 8,641,005 B2

(45) Date of Patent: Feb. 4, 2014

(54) CONTAINER MIXING STAND

(75) Inventor: Scott D. Cimaglio, Antioch, IL (US)

(73) Assignee: United States Gypsum Company, Chicago, IL (US)

( * ) Notice: Subject to any disclaimer, the term of this patent is extended or adjusted under 35 U.S.C. 154(b) by 179 days.

(21) Appl. No.: 12/982,119

(22) Filed: Dec. 30, 2010

(65) Prior Publication Data

US 2012/0168591 A1 Jul. 5, 2012

(51) Int. Cl.

*B65D 19/00* (2006.01)
*A47F 5/00* (2006.01)
*F16L 3/00* (2006.01)
*F16M 11/00* (2006.01)
*F16M 13/00* (2006.01)
*A47B 91/10* (2006.01)

(52) U.S. Cl.

USPC .................. 248/346.01; 248/125.2; 248/121; 248/176.1; 248/309.1; 248/519; 248/346.03

(58) Field of Classification Search

USPC ......... 248/146, 154, 147, 148, 149, 150, 151, 248/346.06, 346.07, 310, 311.2, 311.3, 312, 248/688, 678, 671; 220/571, 571.1, 495.02, 220/544, 545, 546, 549, 550

See application file for complete search history.

(56) References Cited

U.S. PATENT DOCUMENTS 1,227,738 A * 5/1917 Belis et al. .................... 81/3.32
1,828,249 A * 10/1931 Hammond .................... 248/154
2,199,516 A * 5/1940 Yeatts ............................ 81/3.32
2,799,189 A * 7/1957 Goodman, Sr. ................ 81/3.32
3,301,103 A 1/1967 Shultz et al.
4,310,898 A * 1/1982 Yoshida ............................ 365/6
4,515,195 A * 5/1985 Gladstein ...................... 144/366
4,943,111 A * 7/1990 VanderLaan ............. 297/188.17
5,232,188 A 8/1993 Troncone
5,560,758 A * 10/1996 Brown et al. ................ 65/134.4
5,685,518 A * 11/1997 Fox et al. ...................... 248/523
6,227,513 B1 * 5/2001 Richard .................. 248/346.07
6,464,184 B1 10/2002 Lytle
7,018,090 B2 3/2006 Moore
7,258,312 B2 8/2007 Grosse
7,261,262 B2 8/2007 Dunson
7,494,097 B2 * 2/2009 Lidie et al. .................... 248/126
7,494,103 B1 2/2009 Huebner
7,651,060 B2 1/2010 Roth et al.
7,708,242 B1 * 5/2010 Petrashune et al. ........... 248/150
8,011,701 B2 * 9/2011 Taylor .......................... 292/256
2004/0084599 A1 5/2004 Tedesco et al.
2006/0124808 A1 6/2006 Hibbler
2007/0252051 A1 11/2007 Kuipers
2008/0042035 A1 2/2008 Elwood
2009/0256034 A1 10/2009 Poyner

* cited by examiner

*Primary Examiner* — Joshua J Michener
*Assistant Examiner* — Erin W Smith
(74) *Attorney, Agent, or Firm* — Greer, Burns & Crain, Ltd.; Pradip Sahu; Philip T. Petti

(57) ABSTRACT

A container mixing stand including a base plate, and a first wall and a second wall connected to the base plate, where the first wall is spaced from the second wall for receiving a container between the first and second walls. A tensioning mechanism independent of the first wall and the second wall is positioned adjacent to at least one of the first wall and the second wall. The tensioning mechanism is movable between a rest position and a tensioning position, where moving the tensioning mechanism to the tensioning position causes at least one of the first wall and the second wall to move along the base plate toward the container and secure the container between the first wall and the second wall.

17 Claims, 4 Drawing Sheets

CONTAINER MIXING STAND

BACKGROUND OF THE INVENTION

This invention relates generally to devices for securing containers in position for mixing and other operations, and specifically to a stand for securing a container in position for securely mixing joint compound or other compositions in the container.

In the construction industry, building materials such as paint, plaster, mortar, joint compound or other products are typically mixed on site in containers such as pails or buckets. In many such building materials, often a dry, powdered product is mixed with water on site. Depending on the amount of water added, joint compound is a highly viscous material and therefore is difficult to mix. The methods of mixing joint compound vary and typically include using a hand "masher" type mixer or a drill mixer. The hand "masher" type mixer includes an elongated handle with a generally planar, perforated, paddle-like working end. A user holds the handle of the hand "masher" and reciprocally moves the planar end up and down in a piston-like manner in the joint compound in a mashing motion to mix the joint compound. A drill mixer typically includes a power drill having an elongated drill bit with mixing blades at one end.

Mixing such viscous materials by hand or with a drill typically causes the container to move about due to forces generated by the above-described pumping or rotating mixing action. As a result, the person mixing the joint compound is forced to stabilize the container by either holding the container using their free hand, holding the container between their feet or legs, or putting one of their feet on the edge of the container. This makes the mixing process difficult, awkward, hazardous and potentially messy due to spills. One solution to this problem is to have a second person hold the container during the mixing operation. However, utilizing two people to perform the mixing operation is inefficient, and thereby uneconomical as it wastes time and money.

Accordingly, there is a need for a mixing stand that secures a mixing container in place while allowing one operator to stably mix the material in the container.

SUMMARY

The present container mixing stand is a portable platform having spaced walls that are configured to receive and, under user control, secure a container between the walls with user-generated clamping force. In this manner, the container is stabilized for mixing container contents.

More specifically, a container mixing stand is provided that includes a base plate, and a first wall and a second wall connected to the base plate, where the first wall is spaced from the second wall for receiving a container between the first and second walls. A tensioning mechanism independent of the first wall and the second wall is positioned adjacent to at least one of the first wall and the second wall. The tensioning mechanism is movable between a rest position and a tensioning position, where moving the tensioning mechanism to the tensioning position causes at least one of the first wall and the second wall to move along the base plate toward the container and secure the container between the first wall and the second wall.

In another embodiment, a container mixing stand is provided that includes a base plate and a pair of walls spaced apart for receiving a container where at least one of the walls is movably connected to the base plate. A lever arm is pivotally connected to the base plate and coupled to the at least one wall movably connected to the base plate. The lever arm is movable between a rest position and a securing position, where when the lever arm is moved to the securing position, at least one wall movably connected to the base plate is moved into contact with the container for securing the container between the pair of walls.

DETAILED DESCRIPTION

The present mixing container stand is configured for receiving and securing a container, such as a bucket or pail, in place while allowing a user to efficiently mix material in the container. More specifically, the container mixing stand is used for mixing highly viscous compositions such as mortar, paint, plaster, joint compound or powder or granular construction products in a container, so that the container is held securely in position while mixing.

Figure 1:
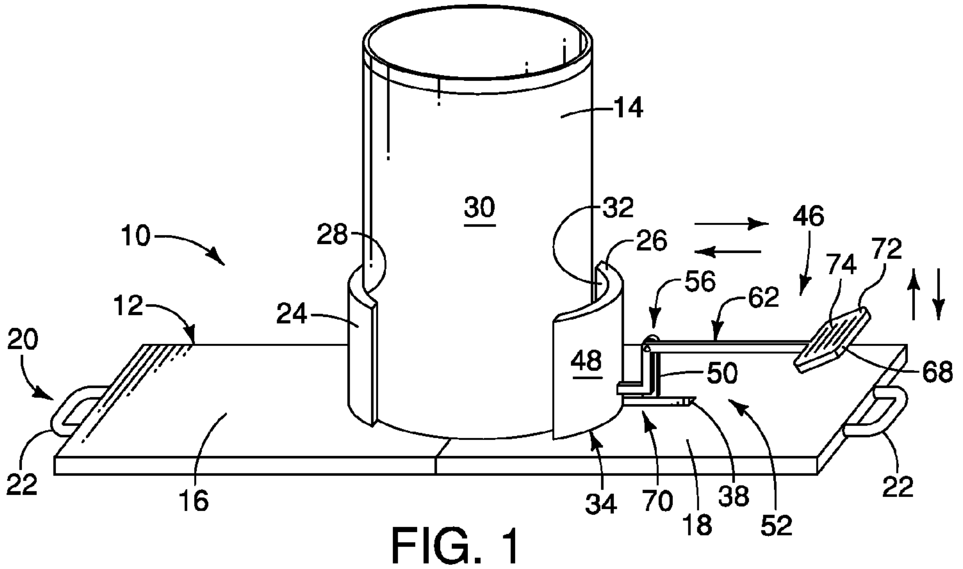
FIG. 1 is a perspective view of an embodiment of the present container mixing stand with the tensioning mechanism in the rest position.
Figure 2:
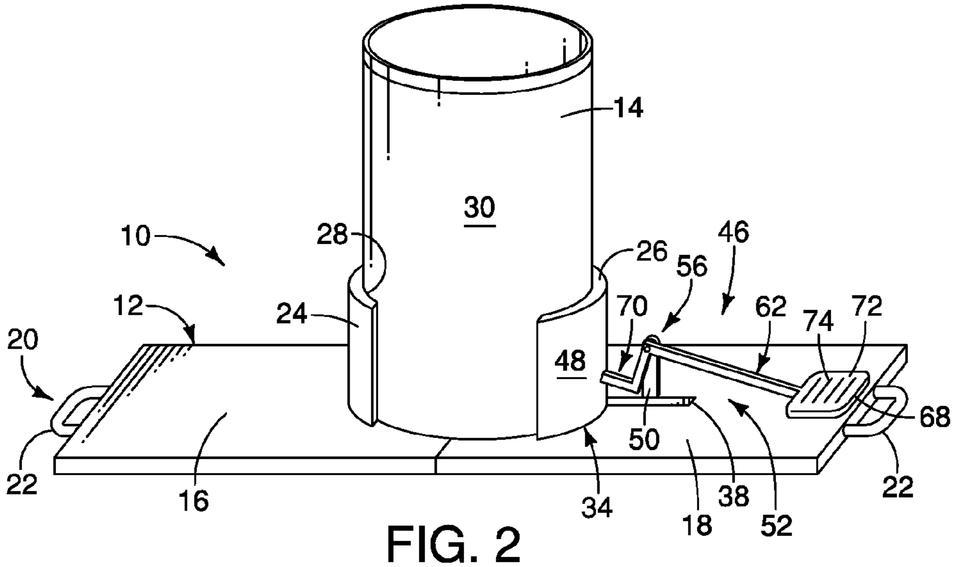
FIG. 2 is a perspective view of the container mixing stand of FIG. 1 with the tensioning mechanism in the tensioning position.
Figure 3:
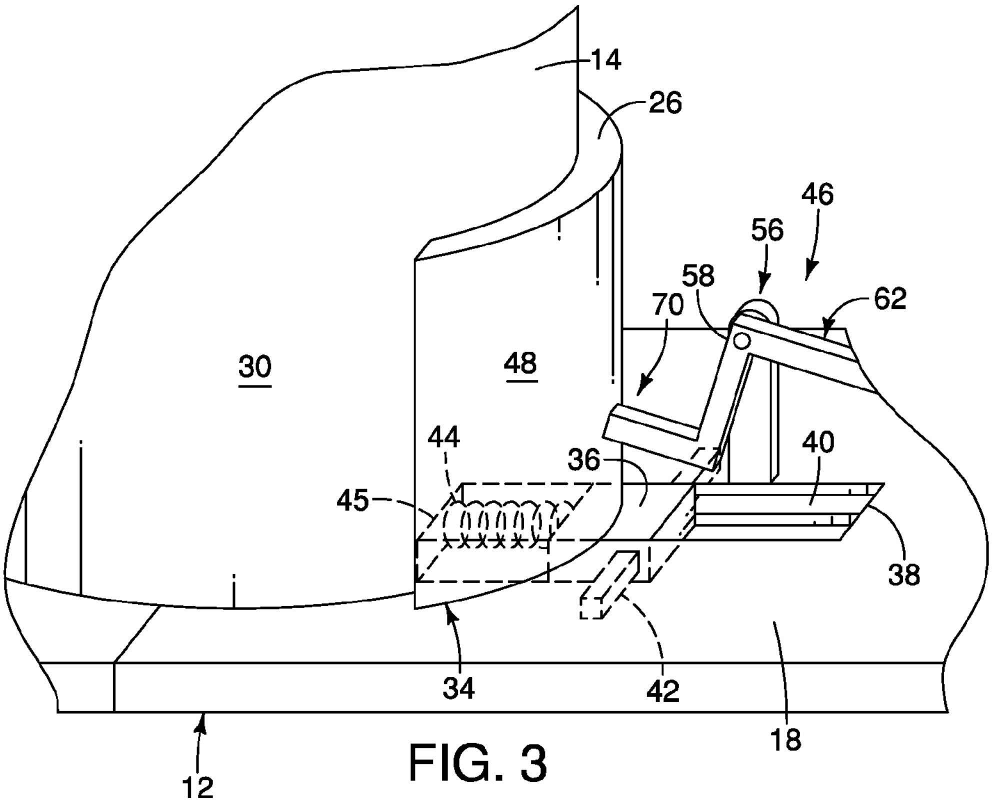
FIG. 3 is an enlarged, fragmentary perspective view of a wall of the container mixing stand of FIGS. 1 and 2.

Referring now to FIGS. 1-3, the present container mixing stand 10 includes a planar base plate or floor plate 12 having a preferably generally rectangular shape and a designated, uniform thickness. The base plate 12 has a length and width that is greater than the outer perimeter of a container 14 so that the container rests securely on a surface of the base plate. Provided that this dimensional condition is met, the base plate 12 can have any shape. A first plate member 16 and a second plate member 18 are hingedly connected together to form the base plate 12 and allow a user to fold the base plate for storage or transport. Alternatively, the base plate 12 may be integrally formed and made of a durable material such as plastic, metal or any durable, suitable self-supporting material or combination of materials. It is contemplated that the container 14 is any type of rigid pail or bucket made of a metal, plastic or the like. In the preferred embodiment, the container 14 is a conventional five gallon bucket. As shown in FIG. 1, a handle 20 is attached to each end of the base plate 12 to facilitate carrying the mixing stand 10. Each end of the base plate 12 also optionally includes a handle half or handle member 22 that mate with each other to form the handle 20 when the first and second plate members 16, 18 are folded together.

A first wall 24 and a second wall 26 are connected to a surface of the base plate 12 and are spaced apart to receive the container 14 as shown in FIG. 1. The first wall 24 is preferably fixedly connected to the base plate 12 and has a curved inner surface 28 that corresponds to a shape of an outer surface 30 of the container 14. The second wall 26 is movably connected to the surface of the base plate 12 and reciprocates inwardly toward the container 14 and outwardly away from the container 14. Similar to the first wall 24, the second wall 26 includes a curved inner surface 32 that corresponds to the shape of the outer surface 30 of the container 14. The corresponding shapes of the first and second walls 24, 26 and the container 14 enable the walls to securely engage and hold the container. Additionally it should be appreciated that one or both of the walls 24, 26 may have a non-slip material attached to or a non-slip coating applied to the inner surface 32 of the walls 24, 26 for gripping and further securing a container between the walls.

Referring now to FIG. 3, a bottom end 34 of the second wall 26 includes a guide block 36 that fits within a generally axially extending groove 38 defined by the base plate 12. Each side of the groove 38 has a designated undercut area 40 such that opposing protruding members 42 of the guide block 36 extend into the undercut areas of the groove to maintain the guide block within the groove. As shown in FIG. 1, the groove 38 is positioned to be transverse to the outer surface 30 of the container 14 to enable the second wall 26 to move toward and away from the container. A bias member, such as a coil spring 44, is connected to either the inner curved surface 32 of the second wall 26 or to an inner end of the guide block 36 for biasing the second wall away from the container 14. The spring 44 is also positioned against or connected to an inner end 45 of the groove 38 where movement of the guide block 36 toward the container 14 compresses the spring 44 against the inner end and where the spring 44 biases the guide block 36 away from the container.

Figure 7:
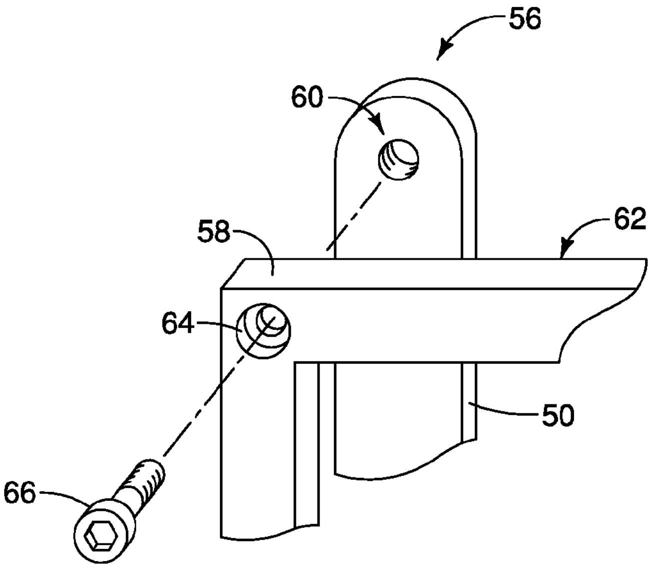
FIG. 7 is an enlarged, exploded fragmentary perspective view of the lever arm and the mounting bracket of the pivot member of the container mixing stand shown in FIGS. 1-6.

Referring now to FIGS. 3 and 7, a tensioning mechanism or tensioner 46 is pivotally connected to the base plate 12 and configured for engaging an outer surface 48 of the second wall 26. Specifically, a mounting bracket 50 is connected to the base plate 12 at a first end 52 and a second end 56 defining a transverse counter-bore hole 60. The tensioner 46 includes an elongated lever arm 62 defining a through-hole 64 where a pivot portion 58 (FIG. 7) of the lever arm is positioned adjacent to an inner side 61 of the mounting bracket 50 and the through-hole 64 is aligned with the holes 60. A pivot pin 66 is inserted through the holes 60 and the through-hole 64 and secured in place by a suitable fastener (not shown). As shown in FIGS. 1-3, the lever arm 62 is connected to the inner side 61 of the mounting bracket 50 so as to be positioned adjacent to a central portion of the wall 26 where the connection between the lever arm and the mounting bracket enables the lever arm to pivot between a rest position (FIG. 1) and a tensioning position (FIG. 2).

As shown in FIGS. 1 and 2, one end of the lever arm 62 includes a generally planar foot plate 68 and an opposing engagement end 70 is configured to engage the second wall 26 for moving the second wall towards the container 14. The foot plate 68 has a size and shape configured for receiving a user's or operator's foot for controlling the pivoting movement of the lever arm 62. In an embodiment, a non-slip material, such as rubber, is attached or applied to an upper surface 72 of the foot plate 68 to inhibit sliding or slipping of the user's foot during operation of the lever arm 62. Additionally, the foot plate 68 optionally includes one or more protrusions 74 (FIG. 1) on its upper surface 72 for enhancing the traction between the foot plate and a user's foot. As shown in FIG. 2, the foot plate 68 is offset relative to the lever arm 62 so that the foot plate rests squarely on the upper surface of the base plate 12 when the lever arm is moved to the tensioning position. Positioning of the foot plate 68 on the base plate 12 enables a user to stand stably on the base plate during the mixing process.

The engagement end 70 of the lever arm 62 is positioned for contacting the outer surface 48 of the second wall 26 and extends further inwardly relative to the second wall as the lever arm 62 pivots from the rest position to the tensioning position. The inward extension of the engagement end 70 correspondingly moves the second wall 26 inwardly until it engages the container 14.

In operation, a container, such as the bucket or pail 14 shown in FIG. 1, is placed between the first and second walls 24, 26 on a top surface of the base plate 12. A user places one of their feet on a portion of the base plate 12 outside of the first wall 24 and the other foot on the elevated foot plate 68 attached to the lever arm 62, which is initially in the rest position (FIG. 1). The user then pushes their foot downwardly on the foot plate 68 to cause the foot plate to move downwardly while the engagement end 70 simultaneously moves upwardly along the outer surface 48 of the second wall 26, thereby pushing the second wall toward the container 14. When the foot plate 68 moves to the tensioning position shown in FIG. 2, the first and second walls 24, 26 securely engage and hold the container 14 in position on the base plate 12. The inward movement of the second wall 26 continues until the first and second walls 24, 26 are contacting the outer surface 30 of the container 14 and securely holding the container in position. In the tensioning position, both of the user's feet are firmly on the top surface of the base plate 12 so that the user is in a stable position for mixing the material in the container 14. Also, the container 14 is secure and will not move around during mixing.

After mixing is complete, the user slowly releases pressure on the foot plate 68, which allows the spring 44 to bias the second wall 26 outwardly away from the container 14. The outward movement of the second wall 26 causes the engagement end 70 of the lever arm 62 to move downwardly along the outer surface 30 of the second wall 26 while the foot plate 68 moves upwardly to the rest position. Once the first and second walls 24, 26 are dis-engaged from the container 14, the container is lifted away from the stand 10 for use on a job.

Figure 4:
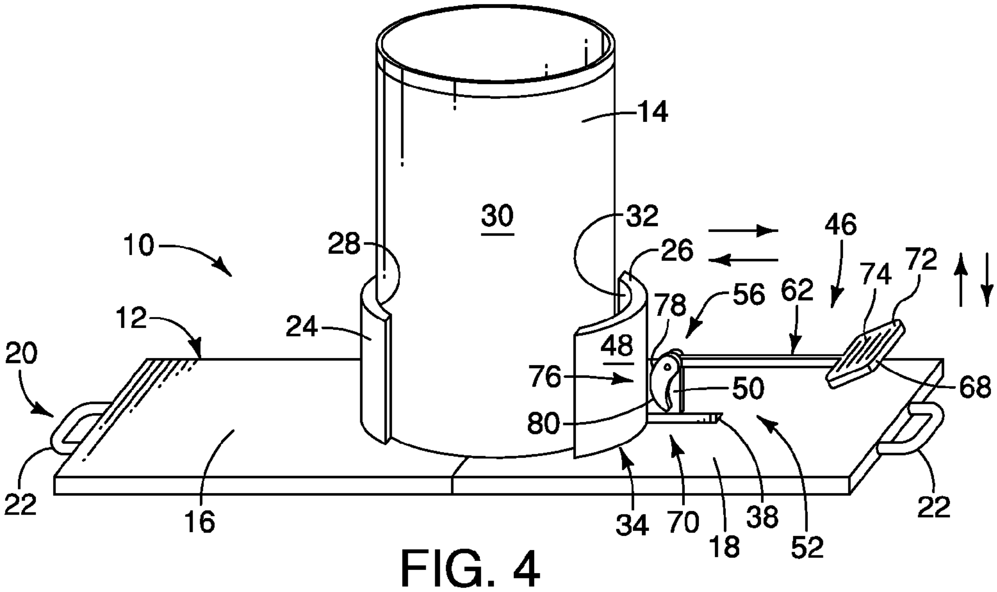
FIG. 4 is a perspective view of another embodiment of the present container mixing stand with the tensioning mechanism in the rest position.
Figure 5:
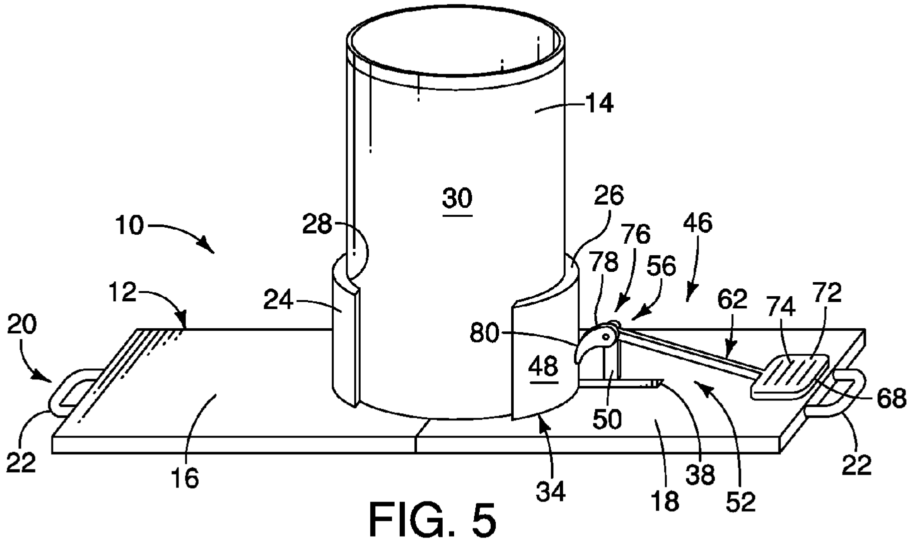
FIG. 5 is a perspective view of the container mixing stand of FIG. 4 with the tensioning mechanism in the tensioning position.

Referring now to FIGS. 4 and 5, another embodiment of the container mixing stand 10 is shown where the engagement end 70 of the lever arm 62 includes a cam member 76. The cam member 76 has a rounded or curved outer surface 78 that is in contact with the outer surface 48 of the second wall 26. As a user pushes down on the foot plate 68 with their foot to move the lever arm 62 from the rest position (FIG. 4) to the tensioning position (FIG. 5), the curved outer surface 78 of the cam member 76 slides upwardly along the outer surface 48 of the second wall 26. The cam member 76 pushes inwardly on the second wall 26 against the biasing force of the spring 44 until the first and second walls 24, 26 securely engage the outer surface 30 of the container 14 to hold it in position. The cam member 76 is configured to have an elongated contact portion 80 having the curved outer surface 78 that increasingly pushes against the outer surface 48 of the second wall 26 as the lever arm 62 moves to the tensioning position to move the second wall 26 inwardly towards the container 14. The user removes their foot from the foot plate 68, which allows the spring 44 to bias the guide block 36 (or inner surface of the second wall 26) away from the container 14 so that the container can be removed from the mixing stand 10.

Figure 6:
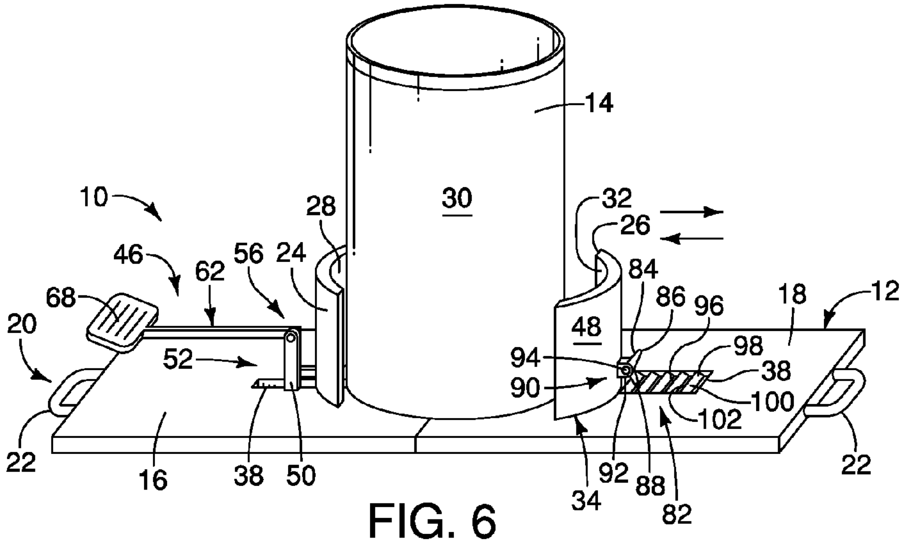
FIG. 6 is a perspective view of a further embodiment of the present container mixing stand including different tensioning mechanisms.
Figure 8:
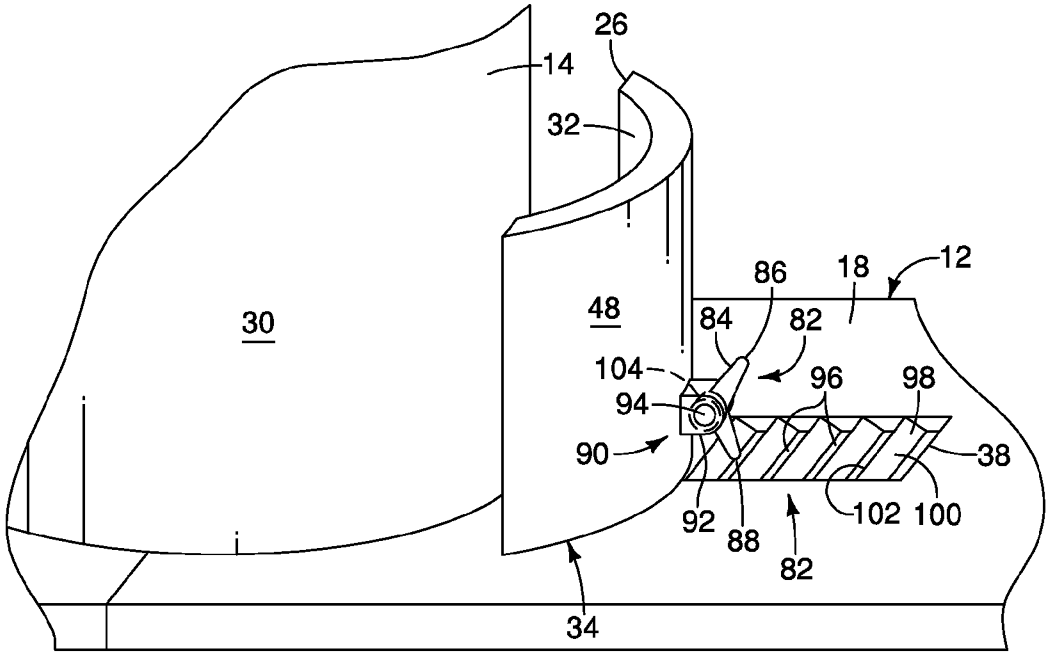
FIG. 8 is an enlarged, fragmentary perspective view of the securing mechanism of FIG. 6.

Referring now to FIGS. 6 and 8, another embodiment of the container mixing stand 10 includes first and second walls 24, 26 that are each movably connected to the base plate 12. In this embodiment, the tensioner 46 of FIGS. 1-2 is positioned on a side of the base plate 12. It should be appreciated that the tensioner 46 may be positioned on the base plate 12 on either side of the container 14. The first and second walls 24, 26 each have a guide block 36 (FIG. 3) connected to a bottom end 34 of the walls that is configured to slidably engage corresponding grooves defined by the base plate 12. Similar to above, the guide block 36 has opposing protruding members 42 laterally extending into undercut areas or portions 40 of the groove 38 such that the protruding members hold the guide block within the groove. The grooves 38 are transverse to the outer surface 30 of the container 14 so that the first and second walls 24, 26 move toward and away from the container.

Included on the second wall 26 is a securing mechanism 82 having a "V"-shaped pivot member 84 including a first end 86 and a second end 88. The pivot member 84 is pivotally connected to a mounting member 90, which is integrally formed on the outer surface 48 of the second wall 26. Each of the mounting member 90 and the pivot member 84 include a through-hole 92. The through-holes 92 are aligned with each other. A pivot pin 94 is inserted through the aligned through-holes 92 and secured in place by a fastener such as a nut. Acting as a pawl, the second end 88 engages indentations 96 formed between triangular stops 98 in the groove 38. A first slanted surface 100 and a second transverse surface 102 on the stops 98 are configured such that the second end slides over the slanted surface until engaging one of the indentations 96 in the groove 38 adjacent to the transverse surface of the stop.

The transverse surfaces 102 of the stops 98 hold the second end 88 (or pawl) in place so that the second wall 26 does not move outwardly from the container 14. A biasing member such as a coil spring 104 (FIG. 8) is connected to the pivot member 84 to bias the second end 88 downwardly into the indentations 96. Therefore, as a user pushes against the second wall 26 to move it inwardly against the container 14, the second end 88 moves sequentially into the indentations 96 until the second wall is secured against the container 14 and the second end is secured in one of the indentations. To release the second end 88 (or pawl) from an indentation 96, a user pushes downwardly on the first end 86 such that the second end 88 moves upwardly out of the indentation 96 and the second wall 26 can then be moved away from the container 14 to remove the container from the base plate 12. It should be appreciated that the base plate 12 may include a tensioner 46 and a securing mechanism 82, two tensioners attached to opposing sides of the base plate or two securing mechanisms attached to opposing sides of the base plate.

While particular embodiments of the present container mixing stand have been shown and described, it will be appreciated by those skilled in the art that changes and modifications may be made thereto without departing from the invention in its broader aspects and as set forth in the following claims.

What is claimed is:

1. A container mixing stand comprising:
a base plate defining a groove;
a first wall connected to said base plate;
a second wall connected to said base plate, said first wall being spaced from said second wall for receiving a container between said first and second walls; and
a tensioning mechanism independent of and positioned adjacent to at least one of said first wall and said second wall and movable between a rest position and a tensioning position, wherein when moving the tensioning mechanism to said tensioning position causes said at least one of said first wall and said second wall to slide in said groove along said base plate toward the container and secure the container between said first wall and said second wall,
said tensioning mechanism including a lever pivotably connected to said base plate, said lever including an engagement end configured to contact and move said at least one of said first wall and said second wall when said tensioning mechanism is moved to said tensioning position.

2. The container mixing stand of claim 1, wherein said lever includes a foot plate on an end of said lever opposite to said engagement end, said foot plate configured to sit securely on a top surface of said base plate when said tensioning mechanism is moved to said tensioning position.

3. The container mixing stand of claim 1, wherein said lever includes a cam-shaped end configured for contacting and moving at least one of said first wall and said second wall when said tensioning mechanism is moved to said tensioning position.

4. The container mixing stand of claim 1, wherein at least one of said first and second walls has a shape that corresponds to a shape of an outer surface of the container.

5. The container mixing stand of claim 1, wherein at least one of said first and second walls has a curved shape.

6. The container mixing stand of claim 1, wherein said first and second walls each have a height that is at least equal to one-third of a height of the container.

7. The container mixing stand of claim 1, wherein said base plate has a uniform thickness.

8. A container mixing stand comprising:
a base plate defining a groove and including a planar bottom surface configured to rest on an underlying surface, said base plate including a first plate member and a second plate member that are hingedly connected together;
a pair of walls spaced apart to receive a container, at least one of said walls being slidably connected to said groove defined by said base plate; and
a lever arm pivotally connected to said base plate and coupled to said at least one wall slidably connected to said groove defined by said base plate, said lever arm being movable between a rest position and a securing position, wherein when said lever arm is moved to said securing position, said at least one wall slides within said groove along said base plate into contact with the container for securing the container between said pair of walls.

9. The container mixing stand of claim 8, wherein said at least one wall slidably connected to said base plate includes a bias member configured to bias said at least one wall away from the container.

10. The container mixing stand of claim 9, wherein said bias member includes a spring.

11. The container mixing stand of claim 8, wherein at least one of said walls has a shape that corresponds to a shape of an outer surface of the container.

12. The container mixing stand of claim 8, wherein at least one of said walls has a curved shape.

13. The container mixing stand of claim 8, wherein said walls each have a height that is at least equal to one-third of a height of the container.

14. A container mixing stand comprising:
a base plate defining at least two grooves;
a pair of walls spaced apart to receive a container, said walls each configured to slide within one of said grooves; and a lever arm pivotally connected to said base plate and coupled to said at least one wall movably connected to said base plate, said lever arm being movable between a rest position and a securing position, wherein when said lever arm is moved to said securing position, said at least one wall movably connected to said base plate is moved into contact with the container for securing the container between said pair of walls.

15. The container mixing stand of claim 14, wherein at least one of said walls includes a pawl configured to engage indents formed in a corresponding one of said grooves.

16. The container mixing stand of claim 1, wherein said base plate includes a first plate member and a second plate member that are hingedly connected together.

17. The container mixing stand of claim 8, wherein the entire bottom surface of said base plate is planar.

* * * * *